No. 875,201. PATENTED DEC. 31, 1907.
R. MOON.
ROLL HOUSING.
APPLICATION FILED NOV. 3, 1906.

2 SHEETS—SHEET 1.

WITNESSES
R A Balderson
W W Swartz

INVENTOR
Richard Moon

No. 875,201.  
R. MOON.  
ROLL HOUSING.  
APPLICATION FILED NOV. 3, 1906.
PATENTED DEC. 31, 1907.
2 SHEETS—SHEET 2.
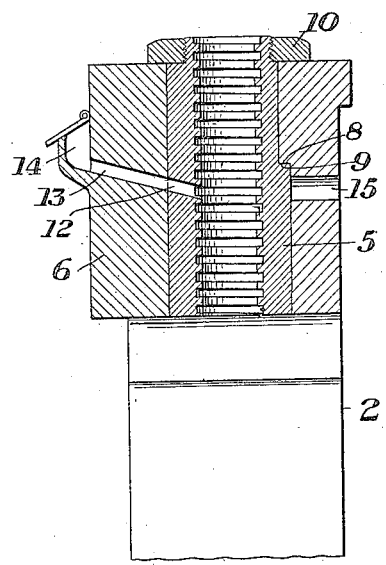
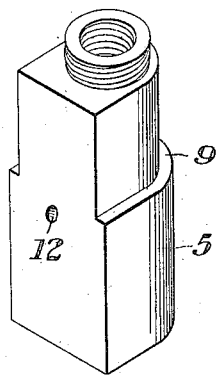
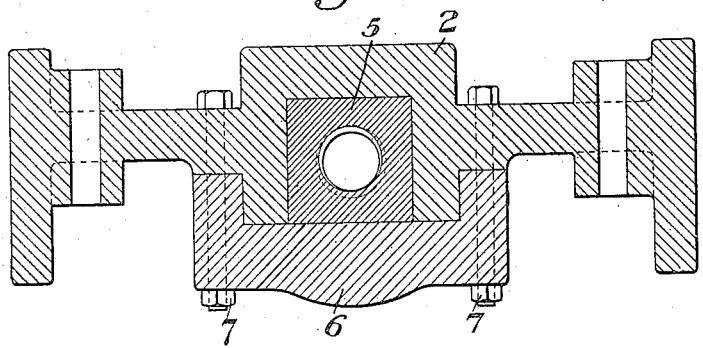
WITNESSES  
R. A. Balderson.  
W. W. Swartz.
INVENTOR  
Richard Moon  
by Bakewell & Byrnes  
his attys

UNITED STATES PATENT OFFICE.

RICHARD MOON, OF HOMESTEAD, PENNSYLVANIA.

ROLL-HOUSING.

No. 875,201.  Specification of Letters Patent.  Patented Dec. 31, 1907.

Application filed November 3, 1906. Serial No. 341,865.

*To all whom it may concern:*

Be it known that I, RICHARD MOON, of Homestead, Allegheny county, Pennsylvania, have invented a new and useful Improvement in Roll-Housings, of which the following is a full, clear, and exact description, reference being had to the accompanying drawings, forming part of this specification, in which—

Figure 1:
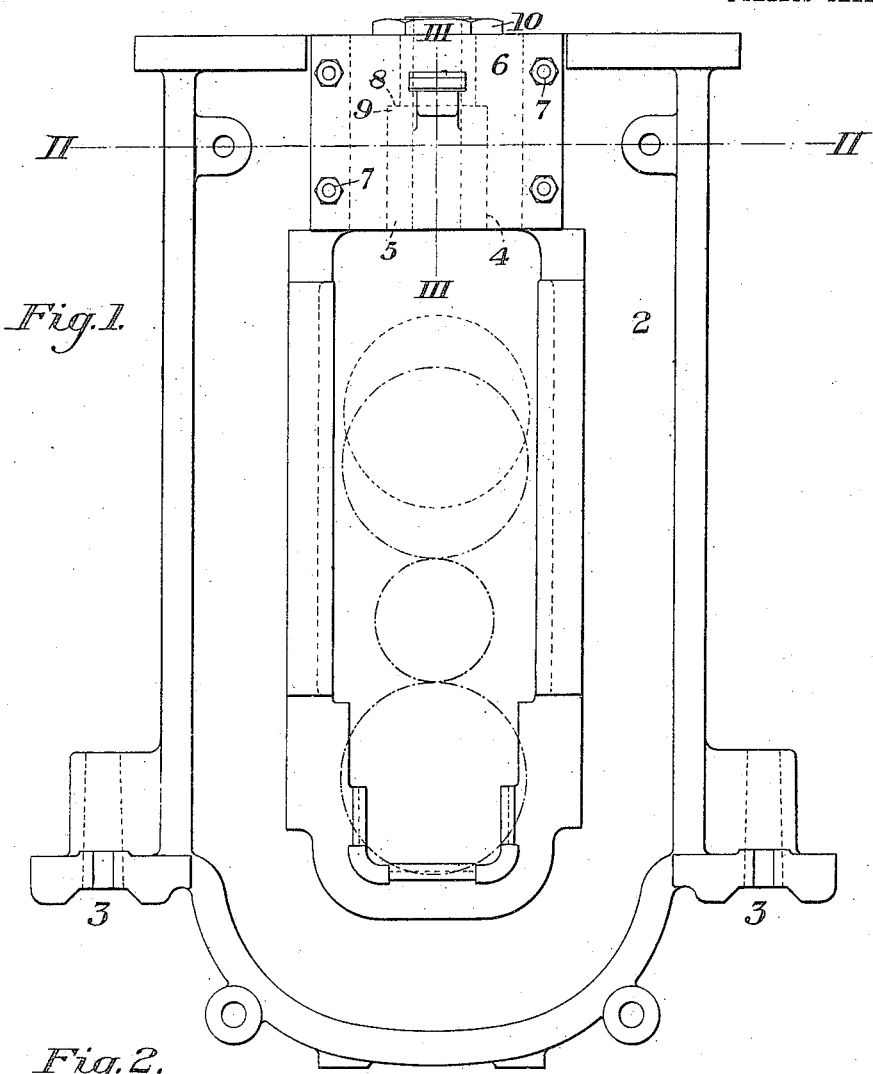
Figure 2:
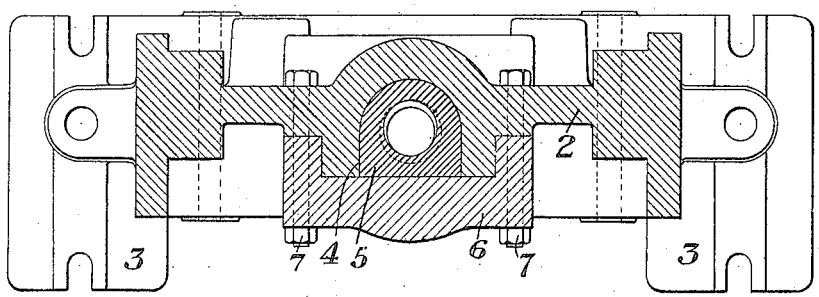

Figure 1 is a front elevation of a closed top roll housing constructed in accordance with my invention; Fig. 2 is a sectional view on the line II—II of Fig. 1; and Fig. 3 is a vertical sectional view on the line III—III of Fig. 1; Fig. 4 is a detail perspective view showing one form of housing-screw nut which may be employed in carrying out my invention; Fig. 5 is a sectional view, similar to that shown in Fig. 2 showing a modification in the construction of the housing-screw and the recess in the housing in which it is secured.

My invention relates to the construction of roll-housings for rolling mills, in which the top roll is adjusted and is held in its adjusted position by means of suitable power-driven housing-screws, which screws operate in suitable housing-screw nuts, the nuts being secured in place in the upper part of the housing, and it more particularly relates to the type of housings usually employed on three-high plate rolling mills and known as closed-top housings. Heretofore in housings of this type the housing-screw nuts have been of cylindrical cross-section, these nuts being pressed into place in a suitable cylindrical opening in the housing by means of hydraulic pressure, or the nuts have been put in place by first heating the housing and after placing the nut in position the nut is held in place by the shrinkage of the housing.

Owing to the manner in which the housing-screw nuts have been secured in place in the housings and on account of the length of these nuts, it has been practically impossible to properly lubricate the lower part of these nuts. In operating these mills the housing screws will become galled and will stick in their nuts, so as to not be movable by the screw-operating mechanism, owing to the enormous forces to which they are subjected and to the great heat to which they are exposed, another cause of the sticking being the imperfect lubrication of the nuts. When such sticking occurs it becomes necessary to back-out the screws from the nuts by hand, resulting in long delays in the operation of the mill. In some cases it becomes necessary to cut off the housing screw and at other times it is necessary to remove the nut from the housing. This causes expensive delays in the operation of the mill, oftentimes twelve to twenty hours being necessary to remove and replace one of the housing screw nuts.

The object of my invention is to provide means by which these difficulties are overcome and by which the nuts may be easily and quickly removed and replaced in the housings. Another object of my invention is to provide improved means by which the nuts are lubricated in a more effective manner than has heretofore been possible and in this way prevent to a large extent the necessity of removing the screws or nuts.

In the drawings, 2 represents a closed top roll housing designed for use on a three-high mill for rolling plates. The housing is provided with the usual feet 3 by which it is secured in place on the housing shoes.

The top or upper portion of the housing 2 is provided with an open side recess or slot 4 in which recess the housing screw nut 5 is secured in place by means of the cap 6 and cap-bolts 7. The recess 4 is provided with a shoulder 8 which engages with a similar shoulder 9 on the nut 5 and prevents movement of the nut by the thrust put upon it through the housing screw in the rolling operation. Movement of the nut 5 in a downward direction is preferably prevented by a locking nut 10 on the upper portion of the housing-screw nut 5, and the shape of the nut 5 effectively prevents it from rotating in the recess 4 in the housing. To lubricate the nut an opening 12 is provided in the housing screw nut 5 which registers with a similar opening 13 leading from the oil or grease cup 14, the cup 14 being preferably cast integral on the cap 6.

When it becomes necessary to remove the housing-screw or the screw nut from its place on the housing, the bolts 7 are loosened and the cap 6 is removed. The nut 5 and the housing-screw is then removed sidewise from the housing and a new nut and screw is put in place. The cap 6 is replaced and is secured by means of the cap-bolts 7, and the mill is again in readiness to be operated. In case any difficulty is met with in starting the nut 5 from its seat when removing the nut, an opening 15 is provided in the housing through which opening a bar may be inserted and the nut driven from its seat.

Variations in the construction of the nuts and in the manner of securing the nuts on the housings may be made without departing from my invention.

By the use of my invention the housing screws and nuts are easily and quickly removed and replaced on the housings and the nuts are lubricated in a more effective manner than has heretofore been possible.

I claim:—

1. A roll housing comprising a housing frame, a housing-screw nut and a recess in the housing frame having an open side in which said nut is secured; substantially as described.

2. A roll housing comprising a housing frame, a housing screw nut, a recess having an open side in the housing and a side cap by which said nut is screwed in said recess, said side cap having an oil box and an opening from said box registering with a similar opening in said nut and communicating with the threaded portion thereof; substantially as described.

3. A roll housing comprising a housing frame, a housing-screw nut, an open recess in said housing and a side cap by which said nut is secured in said recess; substantially as described.

4. A roll housing comprising a housing frame, a housing-screw nut having an annular shoulder portion, an open sided recess in the housing frame also having an annular shoulder portion in which the nut is secured, and means for holding said nut in said recess; substantially as described.

In testimony whereof, I have hereunto set my hand.

RICHARD MOON.

Witnesses:
R. D. LITTLE,
H. M. CORWIN.